United States Patent Office 3,168,370
Patented Feb. 2, 1965

3,168,370
PURIFICATION OF SODIUM DIURANATE
Robert E. Reusser, Bartlesville, Okla., assignor to Phillips Petroleum Company, a corporation of Delaware
No Drawing. Filed May 19, 1960, Ser. No. 30,083
2 Claims. (Cl. 23—14.5)

This invention relates to the recovery of uranium from uranium-bearing materials, such as coffinite and other ores, by the carbonate leaching process. More particularly, it relates to the purification of sodium diuranate ("yellow cake") obtained by the carbonate leaching process.

An important and widely used hydrometallurgical process for recovering uranium from uranium-bearing materials is the "carbonate leaching process." This leaching process has been applied to both primary and secondary uranium mineral deposits, such as pitchblende, coffinite, carnotite, uraninite, tyuyamunite, etc., but it is especially useful in leaching ore of high carbonate content. It is this leaching process that is the concern of the subject invention.

The carbonate leaching process for extracting uranium values from the uranium-bearing materials comprises contacting crushed uranium-bearing ore with hot recycle aqueous alkaline sodium carbonate-sodium bicarbonate solution and, where uranium is present in the quadrivalent state, an oxidizing agent, such as potassium permanganate or air, to form a slurry of leached pulp and pregnant leach liquor containing the stable soluble uranyl tricarbonate complex anion. The pregnant leach solution is separated from the leached pulp, for example by means of a plurality of vacuum drum filters operated in series, and after the pregnant leach solution is clarified, for example by filtering it through a precoated drum filter, the soluble uranium values are precipitated from the pregnant liquor by the addition of an excess of caustic, such as sodium hydroxide. This addition of sodium hydroxide neutralizes the bicarbonate present and then causes the soluble uranium values to precipitate as sodium diuranate (this precipitate commonly called "yellow cake"). The solution containing the precipitated yellow cake is then thickened and separated, for example by filtering the thickened solution in a rotary filter. The yellow cake is then dried and packaged. The hydroxide-carbonate solution recovered as overflow during the thickening of the caustic-treated pregnant solution is commonly referred to as "barren liquor" and it is recarbonated by passing carbon dioxide through it, using for example a supply of waste carbon dioxide such as flue gas. Recarbonated barren liquor is then commonly employed as a carbonate-bicarbonate wash liquid in the filtration of the slurry of leached pulp and pregnant leach solution. The recarbonated barren liquor is then recycled to the leaching operation for reuse.

Other metals and nonmetals are commonly associated with uranium-bearing material. The principal metal commonly associated with uranium-bearing materials is vanadium, although other metals such as zirconium, iron, titanium, barium, aluminum, silicon, antimony, and cobalt, and nonmetallic elements such as phosphorus are commonly associated with uranium-bearing materials. These other metals and nonmetals especially vanadium, are commonly extracted with the uranium values in the carbonate leaching step and gradually build up in concentration in the process. For example, a typical secondary uranium ore such as coffinite will contain about 0.25 percent $U_3O_8$ and 0.1 percent $V_2O_5$, and during the leaching step about 10 to 20 percent of the vanadium present in the ore will also be leached. During the subsequent precipitation of the pregnant leach solution with caustic, some of the vanadium values present in the pregnant liquor will also be precipitated together with the uranium values, for example 40 to 60 percent of the $V_2O_5$ present in the pregnant liquor will precipitate with the yellow cake. In fact, up to 85 percent of the vanadium extracted from the ore may appear in the yellow cake produced. The other metals and nonmetals, present as impurities in the pregnant liquor, will also tend to be precipitated with the yellow cake or become occluded therein. Thus, an impure yellow cake product is often obtained, and, for example, the vanadium content of the yellow cake will often be considerable, e.g., 2 to 7 weight percent.

The presence of these other metals and nonmetals in the yellow cake, especially the presence of vanadium, is undesirable because it renders the subsequent conversion of the yellow cake into uranium metal, or into other uranium compounds such as the hexachloride, much more difficult. The Atomic Energy Commission, a major purchaser of yellow cake produced in this country, penalizes producers of yellow cake if the purity of the yellow cake is not as high as desirable, and it will even refuse to purchase such impure yellow cake. In the case of the vanadium impurity, the Atomic Energy Commission may exact a price penalty if the vanadium content, expressed as $V_2O_5$, exceeds for example two weight percent of the $U_3O_8$ in the yellow cake, or the AEC may refuse to buy the yellow cake if the vanadium contaminant content is excessive. In many cases, the vanadium content of the yellow cake may be as high as six or seven percent of the $U_3O_8$ content. Thus, there has arisen a need for an improved method for producing a purer yellow cake, especially a yellow cake having a relatively low vanadium content.

Accordingly, an object of this invention is to improve the recovery of uranium from uranium-bearing materials. Another object is to provide an improved method for recovering uranium values from uranium ores treated according to the carbonate leaching process. Another object is to purify the sodium diuranate, yellow cake, obtained by the carbonate leaching process for uranium ores. Another object is to substantially remove metals, such as vanadium, commonly associated with uranium-bearing materials, from yellow cake produced by the carbonate leaching process. Another object is to lower the vanadium content of yellow cake produced according to the carbonate leaching process. Another object is to recover valuable vanadium values from the yellow cake product produced according to the carbonate leaching process. Other objects and advantages of this invention will become apparent to those skilled in the art, without departing from the scope and spirit of this invention, from the following discussion and appended claims.

Briefly stated, in one of its broader aspects the subject invention provides an improved method for purifying sodium diuranate containing vanadium values as an impurity by heating or roasting said sodium diuranate at elevated temperatures in the range between about 650° and 870° C. in the presence of 0.5 to 15 weight percent, preferably 2 to 5 weight percent, based on dry sodium diurante, of a salt supplying sodium ion, $Na^+$, selected from the group consisting of sodium carbonate and sodium chloride, for a period of time in the range of about 10 to 30 minutes, preferably 13 to 20 minutes, so as to solubilize a substantial amount of the vanadium values present as impurity in the sodium diuranate. The resulting roasted sodium diuranate is contacted with water to dissolve the solubilized vanadium values, and the resulting insoluble, purified sodium diuranate is recovered from the leaching solution by filtration or the like. The soluble vanadium values can be recovered from the filtered leach solution by any conventional means, for example by acidifying the leach solution to precipitate the soluble vanadium values as sodium hexametavanadate ("red cake"), which compound can be melted and dehydrated to sodium pyrohexavanadate ("black cake").

As mentioned hereinbefore, in recovering uranium from uranium-bearing ore by the carbonate leach process, the pregnant leach solution (which generally will contain 20 to 50 grams/liter $Na_2CO_3$ and 2 to 30 grams/liter $NaHCO_3$) is precipitated by adding an excess of sodium hydroxide, the resulting yellow cake slurry thickened and then filtered in a rotary filter or equivalent separation equipment. The filtered yellow cake, which remains wet with carbonate leach liquor, is normally washed with water, and the washed yellow cake scraped or otherwise removed from the filter and dried.

The source of the sodium ion necessarily present during the roasting step of this invention can be that of the residual or occluded sodium carbonate present in wet yellow cake recovered from the neutralized pregnant leach solution without filtering or washing the same. Or the necessary presence of sodium ion during roasting can be insured by adding the sodium salt to yellow cake, either wet yellow cake or that which has been recovered by filtration and washed.

Following the roasting of the yellow cake in the presence of a sufficient amount of sodium ion necessary to solubilize a substantial portion of the vanadium impurity, the mixture is mixed and leached with water. The amount of water employed will be that necessary to dissolve the solubilized vanadium values, and generally will amount to about 2 to 10 ml. of water per gram of the roasted yellow cake. The uranium values, which remain insoluble in the leach solution, as sodium diuranate, have a tendency to peptize and hamper filtration. As an additional feature of this invention, I have discovered that the peptization of the insoluble uranium values in the leach solution can be minimized or prevented by adding to the leach solution, preferably to the water used in leaching, a sufficient amount of ammonium sulfate, which amount will generally be that sufficient to provide from 1 to 5 grams of $(NH_4)_2SO_4$ per liter of solution.

Following the leaching step, the insoluble solids which comprise sodium diuranate can be separated out by processes such as filtration, decantation or the like. The aqueous leach solution or filtrate can then be acidified, for example to a pH of 1.5, and heated to precipitate the solubilized vanadium values as red cake, sodium hexametavanadate, $Na_2H_2V_6O_{17}$. Separation of the latter and the melting of this residue, which results in driving off one molecule of water, results in the production of black cake, sodium pyrohexavanadate, $Na_2V_6O_{16}$, a valuable vanadium product.

The purified sodium diuranate obtained by the practice of this invention has a materially lower content of vanadium values, the $V_2O_5$ content being materially below AEC penalty levels, e.g., below 2 weight percent of the $U_3O_8$ content.

The objects and advantages of this invention will be further illustrated by the following examples; however, it should be understood that the various amounts, temperatures and other conditions in these examples are merely illustrative and should not be construed so as to unduly limit this invention.

EXAMPLE I

A series of runs were carried out in which samples of the dried commercial yellow cake, each weighing 15 grams and having a $V_2O_5$ content of 1.58 weight percent, were heated in the presence of sodium carbonate at different temperatures. For purposes of comparison, another run was made in which the dry yellow cake sample was heated in the absence of any added sodium carbonate. All samples were heated in covered ceramic crucibles in a muffle furnace to the indicated temperature for 30 minutes, and then cooled to ambient temperature. In each run, the solid products were then contacted with about 50 ml. distilled water, after which the solids were filtered out. The solids were then again washed with 50 ml. distilled water, followed by washing with 50 ml. of 0.2 weight percent aqueous ammonium sulfate. The solids were then dried at 110° C. and the vanadium content determined. Results of these runs are tabulated in Table I.

*Table I*

| Run | $Na_2CO_3$ added, Grams | Treating Temp., °C. | Treated Product | |
|---|---|---|---|---|
| | | | Amount, Grams | $V_2O_5$ Content, Wt. Percent |
| 1 | 0 | 110 | 13.34 | 1.58 |
| 2 | 1.5 | 90 | 13.34 | 1.65 |
| 3 | 1.5 | 400 | 13.30 | 1.38 |
| 4 | 1.5 | 500 | 13.25 | 1.57 |
| 5 | 1.5 | 600 | 13.21 | 1.41 |
| 6 | 1.5 | 700 | 13.00 | 0.14 |

The data of Table I show that heating yellow cake at temperatures below 700° C., in the presence or absence of added sodium carbonate, does not result in any substantial solubilization or reduction of the vanadium content of the yellow cake, whereas heating such yellow cake in the presence of added sodium carbonate at 700° C., according to the practice of this invention, does result in a material solubilization and reduction of the vanadium content of the yellow cake.

EXAMPLE II

In another series of runs, samples of yellow cake ($V_2O_5$ content of about 2.8 weight percent) recovered from a commercial carbonate leach process by various procedures were heated at elevated temperatures, the heated yellow cake product leached with water, and the recovered yellow cake products dried and the vanadium contents thereof determined. In Runs 1 and 4 the yellow cake samples were obtained by filtering precipitated pregnant leach solution without washing the filtered cake. In Run 2, similarly filtered yellow cake was washed once, and in Run 3, similarly filtered yellow cake was washed three times. In Run 5, yellow cake was obtained from thickened precipitated pregnant leach solution without filtering and washing the recovered yellow cake. The yellow cake samples used in Runs 1–3, 5 were wet, and the yellow cake samples used in Run 4 were dry.

In Runs 4 and 5, the yellow cake samples were roasted in covered ceramic crucibles in a muffle furnace in the manner described in Example I, and the leaching of the resulting roasted samples was carried out with leach water containing 2 grams/liter of ammonium sulfate.

The results of these runs are tabulated in Table II.

*Table II*

| Run | Amount of Yellow Cake, Grams | Method of Obtaining Yellow Cake Sample | Temp. of Treatment, °C. | Treated Product | |
|---|---|---|---|---|---|
| | | | | Amount, Grams | $V_2O_5$ Content, Wt. Percent |
| 1 | 30 | Filtered but not washed. | 110 | 18.82 | 2.80 |
| 2 | 24 | Filtered and washed once. | 110 | 15.28 | 2.80 |
| 3 | 24 | Filtered and washed thrice. | 110 | 15.20 | 2.79 |
| 4 | 15 | Filtered but not washed. | 700 | 14.15 | 2.88 |
| 5 | 24 | Not filtered or washed. | 700 | 13.14 | 1.04 |

Examination of the data in Table II shows that the filtered yellow cake samples of Runs 1–3, which were washed 0–3 times, and heated at 110° C., did not result in any material solubilization or reduction of the vanadium content. Examination of such data also shows that the roasting the yellow cake of sample of Run 4 at 700° C., which sample was obtained by filtering pregnant leach solution, also did not result in a material reduction of vanadium content, due to the fact that even filtration of precipitated yellow cake removed practically all of the sodium ion necessary for solubilization of the vanadium content in the yellow cake. However, the data show that in Run 5 the roasting at 700° C. of a yellow cake sample, obtained from thickened precipitated pregnant solution without filtration or washing, does result in a material reduction in the vanadium content of such yellow cake sample, due to the fact that the sample contains a sufficient amount of sodium ion necessary for substantial solubilization of the vanadium values at the roasting temperature.

EXAMPLE III

In this example, samples of dried yellow cake from a commercial uranium plant, each weighing 15 grams and having a $V_2O_5$ content of 1.58 weight percent, were admixed with sodium carbonate and roasted at 700° C. for various lengths of time, after which the roasted products were leached with water and the vanadium content of the recovered yellow cake products determined. For purposes of comparison, another sample (Run 1) of said dried yellow cake was merely washed with water and its vanadium content determined. Also, in another comparison run (Run 2) another sample of the dried yellow cake was heated at 700° C. in the absence of any added sodium carbonate, after which the treated product was leached with water in the same manner as the others.

In those runs where the yellow cake was roasted in the presence of sodium ion, the dry yellow cake samples were charged to a porcelain crucible and mixed therein with 10 ml. of a 150 grams/liter aqueous sodium carbonate solution. The resulting mixture was then dried at 110° C., after which the crucible was heated in a muffle furnace at 700° C. for the indicated treating time duration. The heated crucibles were then cooled to room temperature and the contents thereof transferred to a 250 ml. centrifuge tube where each sample was mixed with 50 ml. of a 2 grams/liter aqueous ammonium sulfate solution. The resulting mixture was stirred, centrifuged, washed with water, decanted, the final solids dried at 110° C., and the vanadium content thereof determined.

Results of these runs are tabulated in Table III.

*Table III*

| Run | $Na_2CO_3$ added, Grams | Treating Temp., ° C. | Treating Duration, Min. | $V_2O_5$ Content, Wt. percent |
|---|---|---|---|---|
| 1 | 0 | | | 1.58 |
| 2 | 0 | 700 | 30 | 0.58 |
| 3 | 1.5 | 700 | 5 | 1.69 |
| 4 | 1.5 | 700 | 10 | 0.65 |
| 5 | 1.5 | 700 | 15 | 0.21 |
| 6 | 1.5 | 700 | 20 | 0.25 |
| 7 | 1.5 | 700 | 25 | 0.49 |
| 8 | 1.5 | 700 | 30 | 0.41 |

The data of Table III show that satisfactory solubilization and reduction of the vanadium content occurred when the yellow cake samples were admixed with sodium carbonate, or contained originally a sufficient amount of sodium carbonate (Run 2), and roasted at 700° C. for a period of time in the range of from 10 to 30 minutes, with maximum reduction occurring during roasting times of about 13 to 20 minutes. Contrariwise, roasting of yellow cake samples in the presence of added sodium carbonate for shorter periods does not materially reduce the vanadium content.

EXAMPLE IV

In another series of runs, samples of undried yellow cake, each weighing 24 grams and having a $V_2O_5$ content of about 2.8 weight percent and wet with carbonate leach solution (i.e., filtered yellow cake samples which are not washed with water), were admixed with sodium carbonate and roasted at 700° C. for various periods of time. For purposes of comparison, in one run (Run 1) the yellow cake sample was merely filtered and washed with water only once. For purposes of further comparison, in another run (Run 2) a sample of yellow cake which had been filtered, water washed and dried was heated at 700° C. in the absence of added sodium carbonate.

In each of the runs wherein the yellow cake samples were roasted at 700° C., the mixtures were dried at 110° C. in nickel crucibles, after which the crucibles were heated in a muffle furnace at 700° C. for the indicated time. After the crucibles were cooled to room temperature, the solids were transferred to 50 ml. centrifuge tubes and washed three times with a 2 grams/liter aqueous ammonium sulfate solution in the manner described in Table III. Results of these runs are set forth in Table IV.

*Table IV*

| Run | $Na_2CO_3$ added, Grams | Treating Temp., ° C. | Treating Duration, Min. | Treated Product | |
|---|---|---|---|---|---|
| | | | | Amount, Grams | $V_2O_5$ Content, Wt. percent |
| 1 | 0 | | | 15.20 | 2.79 |
| 2 | 0 | 700 | 30 | 13.14 | 1.04 |
| 3 | 0.3 | 700 | 5 | 14.49 | 1.09 |
| 4 | 0.3 | 700 | 10 | 13.00 | 0.96 |
| 5 | 0.3 | 700 | 15 | 13.72 | 0.82 |
| 6 | 0.3 | 700 | 20 | 13.72 | 0.88 |
| 7 | 0.3 | 700 | 25 | 14.06 | 1.12 |
| 8 | 0.3 | 700 | 30 | 14.10 | 0.95 |

The data of Table IV show that maximum solubilization and reduction of vanadium content occurs when the yellow cake samples are mixed with sodium carbonate and the mixture is roasted at 700° C. for an optimum time of 10 to 20 minutes.

EXAMPLE V

A run was carried out in which yellow cake, sodium diuranate, containing vanadium as an impurity, was roasted with sodium chloride according to the method of this invention.

In this run, 15 grams of yellow cake, containing 3.9 weight percent $V_2O_5$, was mixed with 1.5 grams of NaCl. The resulting mixture was then roasted at 800–850° C. for 30 minutes, following which the mixture was cooled to room temperature and washed with 220 ml. of water. The weight of the washed cake after drying at 110° C. was 12.6 grams. The vanadium content of the roasted and washed yellow cake was 0.011 weight percent $V_2O_5$.

Various modifications and alterations of this invention will become apparent to those skilled in the art without departing from the scope and spirit of this invenion, and it should be understood that the foregoing illustrations and examples are not to be construed so as to unduly limit this invention.

I claim:
1. A method for purifying sodium diuranate containing impurities comprising vanadium values, which comprises roasting said sodium diuranate at elevated temperatures in the range between about 650° and 870° C. in the presence of a material consisting essentially of a salt selected from the group consisting of sodium carbonate and sodium chloride in the amount in the range between about 0.5 to 15 weight percent, based on said sodium diuranate, for a period of time in the range between about 10 to 30 minutes, leaching the resulting roasted product with water containing an amount of ammonium sulfate sufficient to minimize the peptization of the insoluble sodium diuranate present in said leach mixture, and recovering relatively purer sodium diuranate from the resulting leach mixture.
2. The method according to claim 1 wherein said leach solution contains about 1 to 5 grams of said ammonium sulfate per liter of solution.

(References on following page)

References Cited in the file of this patent

UNITED STATES PATENTS

| | | |
|---|---|---|
| 1,224,014 | Parsons | Apr. 24, 1917 |
| 2,442,429 | Nye | June 1, 1948 |
| 2,587,286 | Brunden | Feb. 26, 1952 |
| 2,630,369 | Burwell | Mar. 3, 1953 |
| 2,654,653 | Nye et al. | Oct. 6, 1953 |
| 2,797,143 | Arendale et al. | June 25, 1957 |
| 2,813,003 | Thunaes et al. | Nov. 12, 1957 |

OTHER REFERENCES

Butler: "Eng. and Mining Journal," vol. 152, No. 3, pp. 61, 62, March 1951.

N.S.A., vol. 10, Abstract 665 (1956), which abstracts AEC Document ACCO 51 by Stanley et al., July 21, 1954, declassified Sept. 23, 1955, 14 pages.

Clegg: "Uranium Ore Processing," pp. 103, 104 (1958).

Clegg: "Uranium Ore Processing," pp. 162–164 (1958).